(12) United States Patent
Inglett et al.

(10) Patent No.: US 9,092,285 B2
(45) Date of Patent: *Jul. 28, 2015

(54) METHOD OF ENTROPY DISTRIBUTION ON A PARALLEL COMPUTER

(71) Applicant: International Business Machines Corporation, Armonk, NY (US)

(72) Inventors: Todd A. Inglett, Rochester, MN (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/778,715

(22) Filed: Feb. 27, 2013

(65) Prior Publication Data

US 2014/0040336 A1 Feb. 6, 2014

Related U.S. Application Data

(63) Continuation of application No. 13/562,486, filed on Jul. 31, 2012.

(51) Int. Cl.
*G06F 7/58* (2006.01)

(52) U.S. Cl.
CPC ............... *G06F 7/582* (2013.01); *G06F 7/588* (2013.01)

(58) Field of Classification Search
None
See application file for complete search history.

(56) References Cited

U.S. PATENT DOCUMENTS

| | | | |
|---|---|---|---|
| 6,611,869 B1 | 8/2003 | Eschelbeck et al. | |
| 6,628,786 B1 | 9/2003 | Dole | |
| 7,362,772 B1 | 4/2008 | Alfieri et al. | |
| 7,571,199 B1 | 8/2009 | Field et al. | |
| 7,930,332 B2 * | 4/2011 | Acar et al. | 708/250 |
| 8,019,802 B2 | 9/2011 | Rose et al. | |
| 8,250,127 B2 * | 8/2012 | Kelly | 708/250 |
| 2003/0051026 A1 | 3/2003 | Carter et al. | |
| 2005/0286719 A1 | 12/2005 | Kemp | |
| 2006/0062384 A1 | 3/2006 | Dondeti | |
| 2008/0256151 A1 * | 10/2008 | Acar et al. | 708/250 |
| 2008/0263117 A1 | 10/2008 | Rose et al. | |
| 2010/0023749 A1 * | 1/2010 | Kelly | 713/150 |
| 2010/0106756 A1 | 4/2010 | Ellison | |
| 2010/0306296 A1 | 12/2010 | Inglett et al. | |
| 2011/0047545 A1 | 2/2011 | Ellison et al. | |
| 2014/0040335 A1 * | 2/2014 | Inglett et al. | 708/250 |
| 2014/0040336 A1 * | 2/2014 | Inglett et al. | 708/250 |

OTHER PUBLICATIONS

U.S. Appl. No. 13/562,486, entitled Method of Entropy Distribution on a Parallel Computer, filed Jul. 31, 2012.

* cited by examiner

*Primary Examiner* — David H Malzahn
(74) *Attorney, Agent, or Firm* — Patterson & Sheridan, LLP

(57) ABSTRACT

Method for performing an operation, the operation including, responsive to receiving a file system request at a file system, retrieving a first entropy pool element from the file system, and inserting, at the file system, the first entropy pool element into a network packet sent from the file system responsive to the file system request.

7 Claims, 6 Drawing Sheets

METHOD OF ENTROPY DISTRIBUTION ON A PARALLEL COMPUTER

CROSS-REFERENCE TO RELATED APPLICATIONS

This application is a continuation of co-pending U.S. patent application Ser. No. 13/562,486, filed Jul. 31, 2012. The aforementioned related patent application is herein incorporated by reference in its entirety.

BACKGROUND

Embodiments disclosed herein relate to distributing entropy from a file system to a parallel computing system.

High quality random numbers are essential for many aspects of computer systems, most notably in the area of security. However, computer systems have a difficult time generating high quality random numbers, i.e., numeric sequences that are close to being truly random. There are many algorithms that generate random numbers, but they typically generate the same sequence of numbers, thus suffering from predictability.

SUMMARY

Embodiments disclosed herein provide a method, system, and computer program product for performing an operation, the operation including, responsive to receiving a file system request at a file system, retrieving a first entropy pool element from the file system, and inserting, at the file system, the first entropy pool element into a network packet sent from the file system responsive to the file system request.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
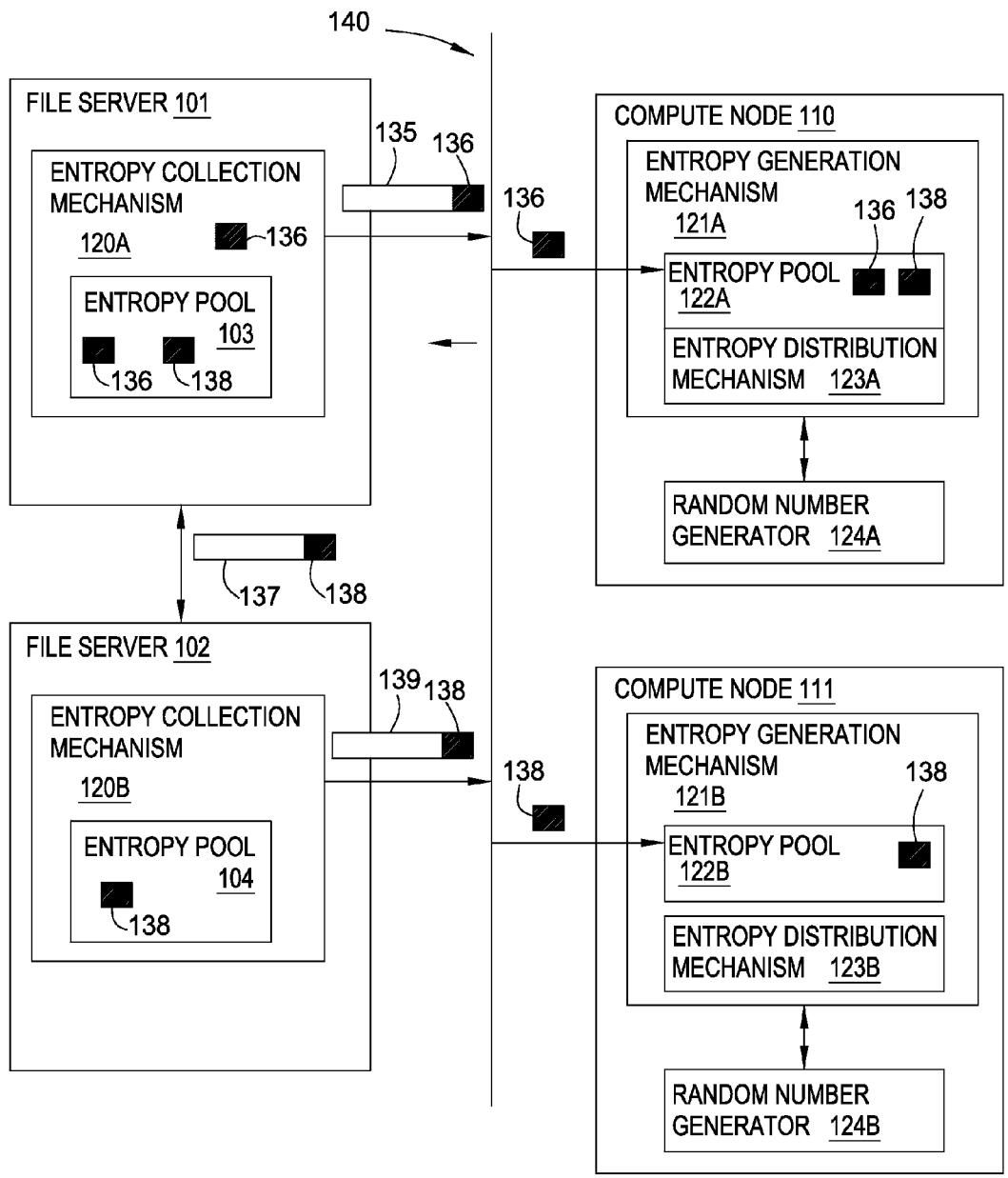
FIG. 1 is a schematic illustrating techniques for distributing entropy pool elements on a massively parallel computing system, according to one embodiment disclosed herein.

A massively parallel computing system, such as Blue Gene® by International Business Machines®, is usually connected with a large external file system. The massively parallel system suffers from a lack of entropy pool elements, yet the large external file system has a high degree of entropy pool elements by the nature of the mechanical disk subsystem under its control. A large quantity of network communication already exists between these systems. Embodiments disclosed herein supplement this network communication by providing entropy pool elements as a portion of each network packet sent from the file system with entropy pool elements to the I/O (and in turn, compute) nodes without entropy pool elements. Embodiments disclosed herein may provide entropy pool elements by including the entropy pool elements in padding fields that are normally present for data alignment in the communication protocols used by these parallel systems. Additionally, the entropy pool elements may be included in unused fields in the communication protocols used by these parallel systems. If such padded or unused fields do not exist, the entropy pool elements may still be appended to each packet such that considerably less overhead than would be required if using full network packets dedicated for distributing entropy pool elements.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An entropy property, as used herein, refers to the ability of a random number generator to provide an equal probability of outputting each individual value of a set of predefined values that the random number generator is configured to output. To improve the entropy property of a random number generator, an I/O node or a compute node may add entropy pool elements to its entropy pool as a way to generate differing sequences of random numbers. In one embodiment, an entropy pool includes a set of one or more entropy pool elements. The set of entropy pool elements may be used as input to a random number generator in order to compute a random number. An entropy pool element generally provides an arbitrary length sequence of bits.

Some computing systems do not have a good source of entropy from which to create entropy pool elements. Instead, a computing system may rely on the seemingly random behavior of a human typing on a keyboard or interacting with a mouse to generate entropy pool elements. Other techniques involve the use of time intervals between interrupts to add entropy pool elements, although this is frequently not useful due to the regularity of these intervals and the ability of outside forces to manipulate these intervals. As a result, computing systems with limited external or user inputs, such as embedded systems or massively parallel computers, may have a particularly hard time adding entropy pool elements to the system.

FIG. 1 is a schematic diagram 100 illustrating techniques for distributing entropy pool elements on a massively parallel computing system, according to one embodiment disclosed herein. The schematic diagram 100 is a simplified version of the design and layout of a massively parallel computing system. As shown, the schematic 100 includes file servers 101 and 102. As shown, the file servers 101 and 102 each include an entropy collection mechanism 120A and 120B, respectively. Entropy collection mechanisms 120A-B are generally configured to retrieve, store, and transmit entropy pool elements. In some embodiments, the entropy collection mechanisms 120A-B store entropy pool elements in entropy pools 103 and 104, respectively. As shown, entropy pool 103 contains entropy pool elements 136 and 138, while entropy pool 103 contains entropy pool element 138. In some embodiments, the entropy pool elements may be shared between file servers 101 and 102 through communication messages sent between the file system, such as the General Parallel File System® (GPFS®), a high-performance shared-disk clustered file system developed by IBM. Generally, the entropy pool elements are gathered by the entropy collection mechanisms 120A-B using accesses to the disk subsystems in the file servers 101 and 102. For example, when a read request is received by the file server 101, it may access a particular location on the disk subsystem, the disk and the location each having their own unique identifying information. For example, a disk may have sectors, cylinders, platters, and zones, each element with its own unique identifying information. In some embodiments, the unique identifiers may be selected as entropy pool elements, or the entropy collection mechanism 120A may use the unique identifiers as input into an entropy pool element generation algorithm, which may output entropy pool elements, such as entropy pool element 136.

As shown, the schematic 100 also includes two compute nodes 110 and 111, each having an entropy generation mechanism 121A and 121B, respectively. In some embodiments, the compute nodes 110 and 111 may be I/O nodes of a larger, more complex parallel computer as depicted by system 200, described in greater detail with reference to FIG. 2. Residing inside the entropy generation mechanisms 121A-B are entropy pools 122A and 122B, respectively, and entropy distribution mechanisms 123A and 123B. As shown, the entropy generation mechanisms 121A-B communicate with random number generators 124A and 124B, respectively. For example, the entropy generation mechanisms 121A-B may store entropy pool elements in entropy pools 122A-B, which are sent to random number generators 124A-B by entropy distribution mechanisms 124A-B. The file servers and I/O nodes communicate via a network 140. For example, an I/O node may send a request to the file server 101 for a file. In response, the file server 101 may generate a sequence of one or more packets (e.g., packet 135) to be sent to the destination I/O node. For example, the I/O node 110 or the I/O node 111 may be the destination I/O node, but any I/O node in the parallel computing system may be the destination I/O node. The entropy collection mechanism 120A may append the entropy pool element 136 to the network packet 135 prior to leaving the file server 101, where it is sent via the network 140 to its destination I/O node. In some embodiments, the entropy collection mechanisms 120A-B may append entropy pool elements retrieved from the entropy pools 103 and 104, respectively. Alternatively, the entropy pool elements may be appended into network packets without having been stored in the entropy pools 103-104. Although shown as being appended to one end of the network packet 135, the positioning is for illustrative purposes only, as the entropy pool elements 136 may be placed at any position in the network packet. While traversing the network 140, the network packet 135, including entropy pool element 136, may pass through the I/O nodes 110 and 111, which may extract the entropy pool element 136 from the network packet 135. As shown, the entropy pool 121A stores entropy pool element 136, which it extracted from the network packet 135.

File server 102 is shown generating a network packet 139, which may be generated, e.g., in response to a resource request from the I/O node 111. As shown, the entropy pool 104 of entropy collection mechanism 120B contains the entropy pool element 138, which may be appended to the network packet 139. While traversing the network, the entropy pool element 138 may be extracted from the network packet 139 by both I/O node 110 and I/O node 111, as the entropy pool element 138 is shown as residing in the respective entropy pools 122A-B. The entropy pool element 138 also resides in the entropy pool 103 of the file server 101. In some embodiments, the file server 102 may append the entropy pool element 138 to a network packet 137 sent to the file server 101. In some embodiments, the file server 102 may be a metadata server, and the file server 101 may store files, and communication between the two servers is necessary to fulfill file server requests. Appending entropy pool element 138 to the network packet 137 increases the amount of entropy pool elements stored throughout the file servers, which may enhance the quality of entropy pool elements sent to the I/O nodes.

Figure 2:
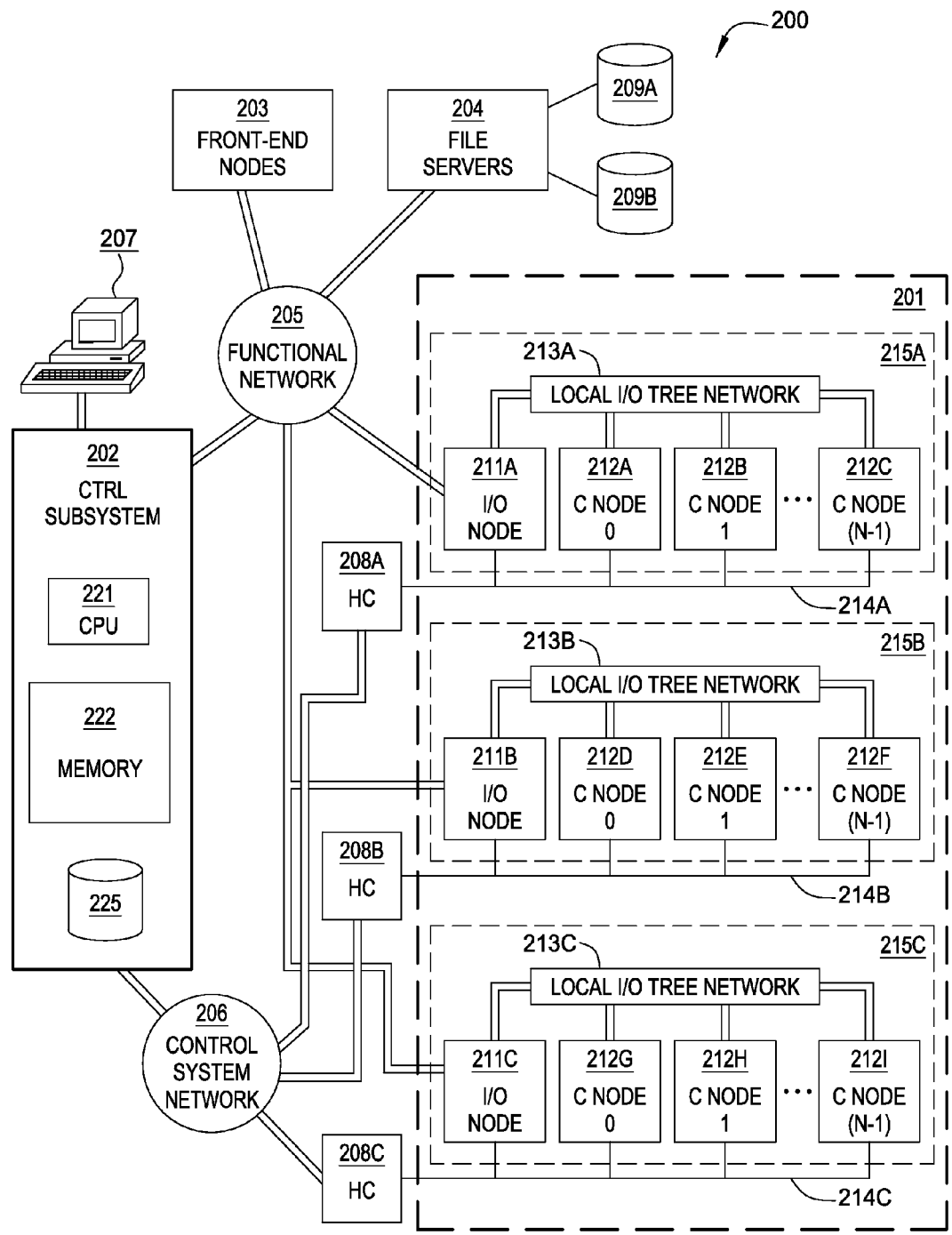
FIG. 2 is a block diagram of components of a massively parallel computer system, according to one embodiment disclosed herein.

FIG. 2 is a block diagram of components of a massively parallel computer system 200, according to one embodiment disclosed herein. Illustratively, computer system 200 shows the high-level architecture of an IBM Blue Gene® computer system, it being understood that other parallel computer systems could be used, and the description of a preferred embodiment herein is not intended to limit the present disclosure.

As shown, computer system 200 includes a compute core 201 having a number of compute nodes arranged in a regular array or matrix, which perform the useful work performed by system 200. The operation of computer system 200, including compute core 201, may be controlled by control subsystem 202. Various additional processors in front-end nodes 203 may perform auxiliary data processing functions, and file servers 204 provide an interface to data storage devices such as disk based storage 209A, 209B or other I/O (not shown). Functional network 205 provides the primary data communication path among compute core 201 and other system components. For example, data stored in storage devices attached to file servers 204 is loaded and stored to other system components through functional network 205.

Also as shown, compute core 201 includes I/O nodes 211A-C and compute nodes 212A-I. Compute nodes 212 provide the processing capacity of parallel system 200, and are configured to execute applications written for parallel processing. I/O nodes 211 handle I/O operations on behalf of compute nodes 212. Each I/O node 211 may include a processor and interface hardware that handles I/O operations for a set of N compute nodes 212, the I/O node and its respective set of N compute nodes are referred to as a Pset. In some embodiments, each I/O node 211A-C may have an entropy generation mechanism corresponding to the entropy generation mechanism 121A and 121B of FIG. 1, the entropy generation mechanism containing an entropy pool and entropy distribution mechanism corresponding to those depicted in FIG. 1. Compute core 201 contains M Psets 215A-C, each including a single I/O node 211 and N compute nodes 212, for a total of M×N compute nodes 212. The product M×N can be very large. For example, in one implementation M=1024 (1K) and N=64, for a total of 64K compute nodes.

In general, application programming code and other data input required by compute core 201 to execute user applications, as well as data output produced by the compute core 201, is communicated over functional network 205. The compute nodes within a Pset 215 communicate with the corresponding I/O node over a corresponding local I/O collective network 213A-C. The I/O nodes, in turn, are connected to functional network 205, over which they communicate with I/O devices attached to file servers 204, or with other system components. Thus, the local I/O collective networks 213 may be viewed logically as extensions of functional network 205, and like functional network 205 are used for data I/O, although they are physically separated from functional network 205. One example of the collective network is a tree network.

Control subsystem 202 directs the operation of the compute nodes 212 in compute core 201. Control subsystem 202 is a computer that includes a processor (or processors) 221, internal memory 222, and local storage 225. An attached console 207 may be used by a system administrator or similar person. Control subsystem 202 may also include an internal database which maintains state information for the compute nodes in core 201, and an application which may be configured to, among other things, control the allocation of hardware in compute core 201, direct the loading of data on compute nodes 211, and perform diagnostic and maintenance functions.

Control subsystem 202 communicates control and state information with the nodes of compute core 201 over control system network 206. Network 206 is coupled to a set of hardware controllers 208A-C. Each hardware controller communicates with the nodes of a respective Pset 215 over a corresponding local hardware control network 214A-C. The hardware controllers 208 and local hardware control networks 214 are logically an extension of control system network 206, although physically separate.

In addition to control subsystem 202, front-end nodes 203 provide computer systems used to perform auxiliary functions which, for efficiency or otherwise, are best performed outside compute core 201. Functions which involve substantial I/O operations are generally performed in the front-end nodes. For example, interactive data input, application code editing, or other user interface functions are generally handled by front-end nodes 203, as is application code compilation. Front-end nodes 203 are connected to functional network 205 and may communicate with file servers 204.

In one embodiment, the computer system 200 determines, from among a plurality of class route identifiers for each of the compute nodes along a communications path from a source compute node to a target compute node in the network, a class route identifier available for all of the compute nodes along the communications path. The computer system 200 configures network hardware of each compute node along the communications path with routing instructions in dependence upon the available class route identifier and a network topology for the network. The routing instructions for each compute node associate the available class route identifier with the network links between that compute node and each compute node adjacent to that compute node along the communications path. The source compute node transmits a network packet to the target compute node along the communications path, which includes encoding the available class route identifier in a network packet. The network hardware of each compute node along the communications path routes the network packet to the target compute node in dependence upon the routing instructions for the network hardware of each compute node and the available class route identifier encoded in the network packet. As used herein, the source compute node is a compute node attempting to transmit a network packet, while the target compute node is a compute node intended as a final recipient of the network packet.

In one embodiment, a class route identifier is an identifier that specifies a set of routing instructions for use by a compute node in routing a particular network packet in the network. When a compute node receives a network packet, the network hardware of the compute node identifies the class route identifier from the header of the packet and then routes the packet according to the routing instructions associated with that particular class route identifier. Accordingly, by using different class route identifiers, a compute node may route network packets using different sets of routing instructions. The number of class route identifiers that each compute node is capable of utilizing may be finite and may typically depend on the number of bits allocated for storing the class route identifier. An "available" class route identifier is a class route identifier that is not actively utilized by the network hardware of a compute node to route network packets. For example, a compute node may be capable of utilizing sixteen class route identifiers labeled 0-15 but only actively utilize class route identifiers 0 and 1. To deactivate the remaining class route identifiers, the compute node may disassociate each of the available class route identifiers with any routing instructions or maintain a list of the available class route identifiers in memory.

Routing instructions specify the manner in which a compute node routes packets for a particular class route identifier. Using different routing instructions for different class route identifiers, a compute node may route different packets according to different routing instructions. For example, for one class route identifier, a compute node may route packets specifying that class route identifier to a particular adjacent compute node. For another class route identifier, the compute node may route packets specifying that class route identifier to different adjacent compute node. In such a manner, two different routing configurations may exist among the same compute nodes on the same physical network.

Figure 3:
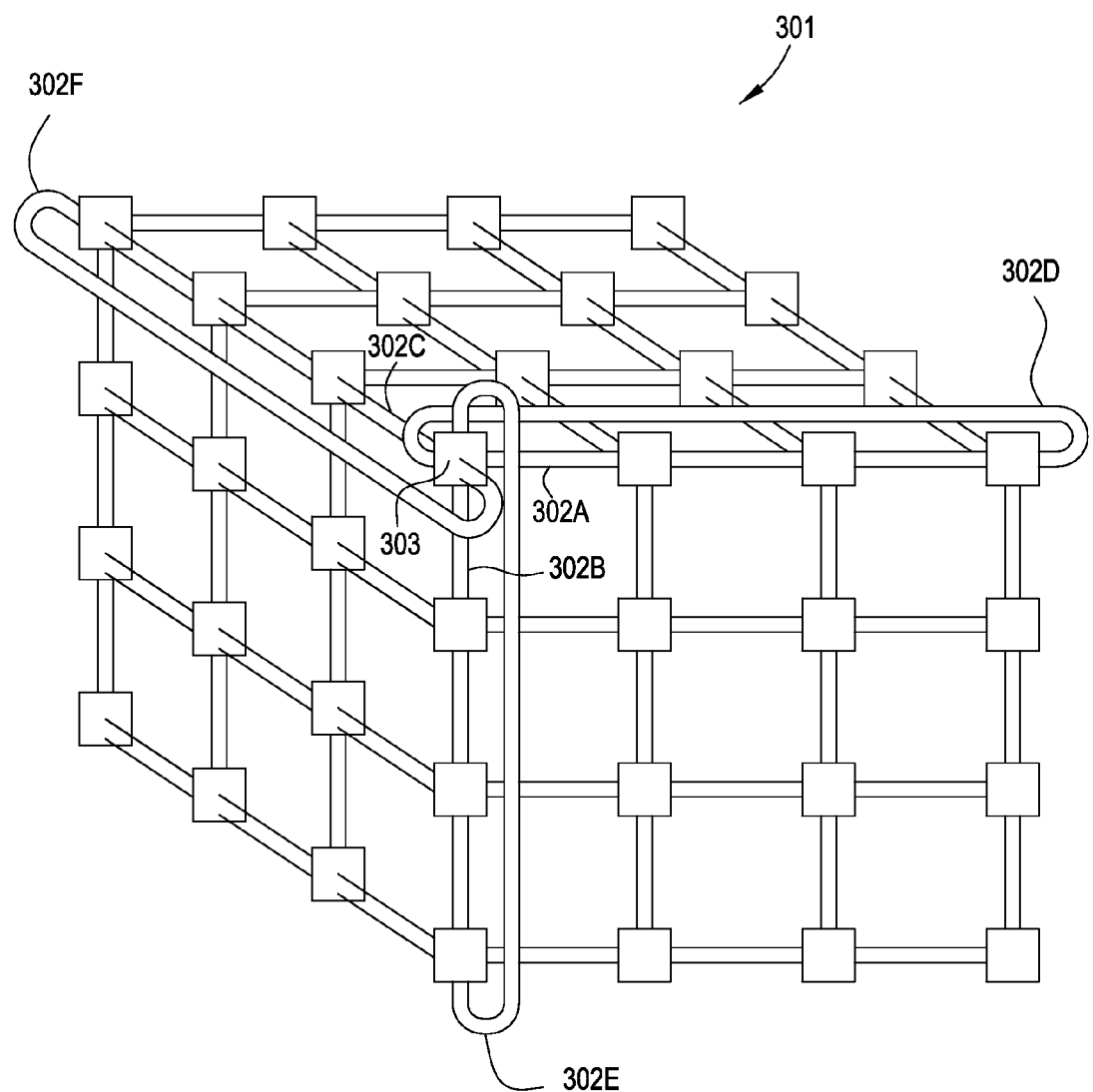
FIG. 3 is a conceptual illustration of a three-dimensional torus network of the system, according to one embodiment disclosed herein.

In one embodiment, compute nodes 212 are arranged logically in a three-dimensional torus, where each compute node 212 may be identified using an x, y and z coordinate. FIG. 3 is a conceptual illustration of a three-dimensional torus network of system 200, according to one embodiment disclosed herein. More specifically, FIG. 3 illustrates a 4×4×4 torus 301 of compute nodes, in which the interior nodes are omitted for clarity. Although FIG. 2 shows a 4×4×4 torus having 64 nodes, it will be understood that the actual number of compute nodes in a parallel computing system is typically much larger. For example, a complete Blue Gene/L system includes 65,536 compute nodes. Each compute node 212 in torus 301 includes a set of six node-to-node communication links 302A-F which allows each compute nodes in torus 301 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 301, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 3 by links 302D, 302E and 302F which wrap around from a last node in the x, y and z dimensions to a first node. Thus, although node 303 appears to be at a "corner" of the torus, node-to-node links 302A-F link node 303 to nodes 302D, 302E and 302F, in the x, y and z dimensions of torus 301.

Figure 4:
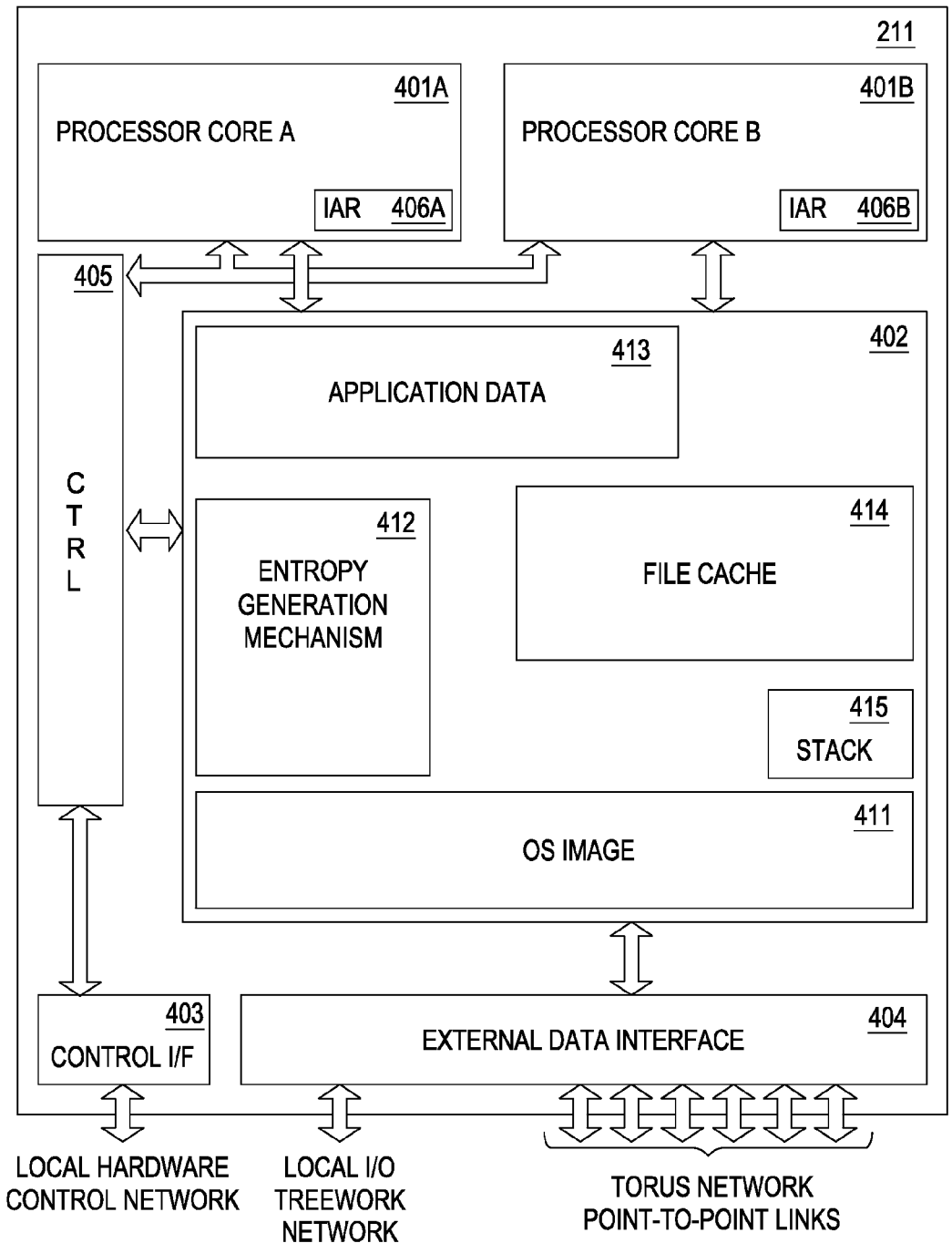
FIG. 4 is a diagram of an I/O node of the system, according to one embodiment disclosed herein.

FIG. 4 is a diagram of an I/O node 211 of the system 200 of FIG. 2, according to one embodiment. The I/O node 211 may correspond to the I/O nodes 110 and 111 of FIG. 1. As shown, I/O node 211 includes processor cores 401A and 401B, and also includes memory 402 used by both processor cores 401; an external control interface 403 which is coupled to local hardware control network 214; an external data communications interface 404 which is coupled to the corresponding local I/O collective network 213, and the corresponding six node-to-node links 302 of the torus network 301; and monitoring and control logic 405 which receives and responds to control commands received through external control interface 403. Monitoring and control logic 405 may access processor cores 401 and locations in memory 402 on behalf of control subsystem 202 to read (or in some cases alter) the operational state of I/O node 211. In one embodiment, each I/O node 211 may be physically implemented as a single, discrete integrated circuit chip.

As shown in FIG. 4, memory 402 stores an operating system image 411, an application code image 412 and user application data structures 413 as required. Some portion of memory 402 may be allocated as a file cache 414, i.e., a cache of data read from or to be written to an I/O file. Operating system image 411 provides a copy of a simplified-function operating system running on I/O node 211. Operating system image 411 may includes a minimal set of functions required to support operation of the I/O node 211. As shown, the memory 402 also contains the entropy generation mechanism 402. In some embodiments, the entropy generation mechanism is an equivalent of the entropy generation mechanisms 121A-B of FIG. 1. As discussed with reference to FIG. 1, the entropy generation mechanism 402 is generally configured to store entropy pool elements in an entropy pool, which may be distributed to a random number generator residing in the memory 402 by an entropy distribution mechanism. In some embodiments, the entropy generation mechanism 412 extracts entropy pool elements from network packets sent by the file server 204 to any one of the I/O nodes 211 of the compute core 201. Any I/O node 211 in the compute core 201 may extract entropy pool elements from network packets sent to different I/O nodes 211 from the file system.

Figure 5:
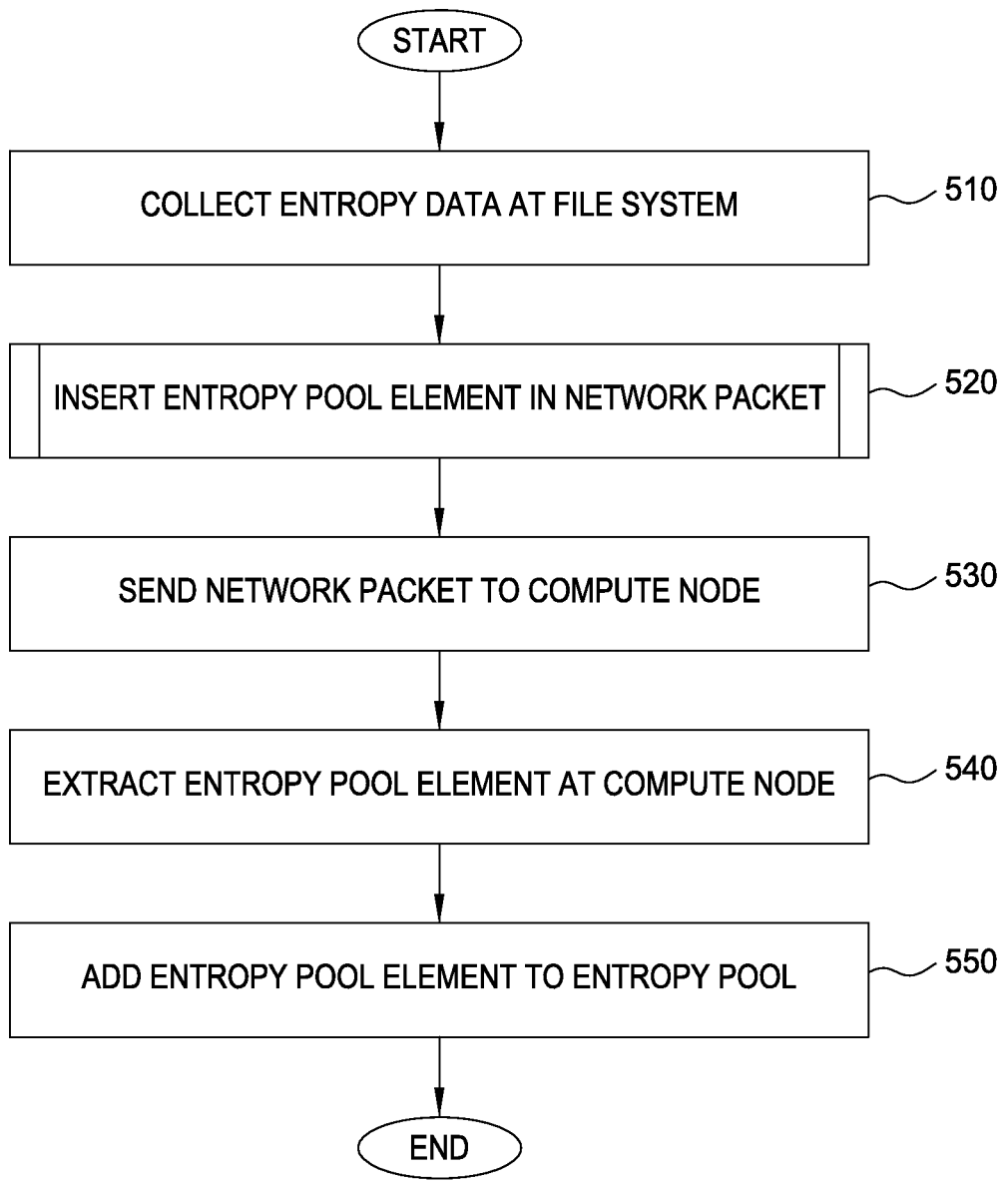
FIG. 5 is a flow chart illustrating a method of distributing entropy pool elements on a parallel computing system, according to one embodiment disclosed herein.

FIG. 5 is a flow chart illustrating a method 500 of distributing entropy pool elements on a massively parallel computing system, according to one embodiment disclosed herein. Generally, the method 500 describes techniques for distributing entropy pool elements collected at a file system to the I/O nodes of a parallel computing system. The entropy pool elements are collected at the file system, inserted into network packets at the file system, and transmitted to a destination I/O node. While in transit to the destination node, the entropy pool elements may be extracted by any of the plurality of I/O nodes in the parallel computing system for storage in the entropy pools of the I/O nodes. At step 510, entropy pool elements are collected at the file system by the entropy collection mechanism. The entropy collection mechanism may collect entropy pool elements by the random nature of the mechanical disk subsystem of the file system. For example, when a file system access is made, a particular location on a particular disk of the file system may be referenced. The entropy collection mechanism may collect unique identifiers for the disk and its sectors, cylinders, platters, and zones. In some embodiments, these unique identifiers may be collected as entropy pool elements. In some other embodiments, the entropy collection mechanism may use these unique identifiers as inputs into an entropy pool element generation algorithm, which outputs entropy pool elements. Upon collecting entropy pool elements, the entropy collection mechanism may store the entropy pool elements in an entropy pool.

At step 520, the entropy collection mechanism may insert an entropy pool element into a network packet which will be sent from the file system to an I/O node. The network packet may be based on a protocol, including, but not limited to Ethernet and small computer system interface (SCSI) protocols. The entropy collection mechanism may obtain the entropy pool element from the entropy pool, or may insert the entropy pool element into a network packet upon collecting the entropy pool element at step 510. Inserting the entropy pool element into a network packet will be described below in greater detail with reference to FIG. 6. At step 530, the network packet containing the entropy pool element is sent from the file system to the I/O node. At step 540, the entropy pool element is extracted from the network packet by the entropy generation mechanism of an I/O node. An I/O node may extract the entropy pool element even if it is not the destination of the network packet, so long as the network packet is accessible by the I/O node. Generally, the parallel computing system may be configured to specify a location for entropy pool elements in a network packet, so the entropy generation mechanisms of the I/O nodes will know which portion of the network packet contains the entropy pool element such that it may be extracted. At step 550, the extracted entropy pool element is added to the entropy pool of the I/O node. Once the entropy pool element is in the entropy pool of the I/O node, it may be sent to a random number generator to be used as input in an algorithm for generating random numbers.

Figure 6:
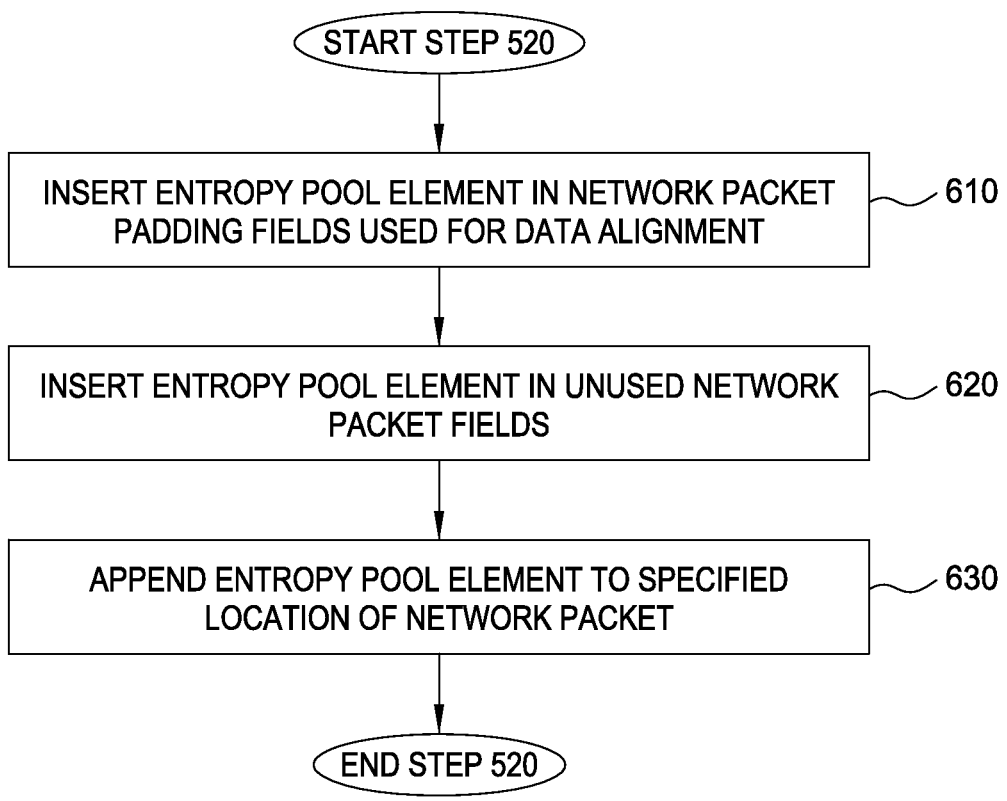
FIG. 6 is a flow chart illustrating a method for inserting pool elements into a network packet, according to one embodiment disclosed herein.

FIG. 6 is a flow chart illustrating a method 600 corresponding to step 520 for inserting entropy pool elements into a network packet, according to one embodiment disclosed herein. When an entropy pool element is collected by the entropy collection mechanism of a file server, the entropy pool element may be added to the entropy pool of the entropy collection mechanism. Alternatively, the entropy pool element may be inserted into a network packet without first being added to the entropy pool. Any algorithm may be used to select an entropy pool element from the entropy pool to insert into a network packet. For example, the newest or oldest entropy pool element may be selected. An entropy pool element may be randomly selected. If additional space exists in the network packet, more than one entropy pool element may be inserted into the network packet.

Although the steps of the method 600 are depicted as a flow chart, one, several, or all of the steps of the method may be used to insert entropy pool elements into a network packet or network idle packet. The entropy pool elements may be added to the network packets at any number of levels of the file system. At the lowest level, the hardware network controllers, or the device driver software operating the network controllers, may take entropy collected by the entropy collection mechanism and add it to each (or some) of the network packets sent by the file system. At a higher level, entropy pool elements may be padded to messages used to implement the file system itself, as each request for data requires a response from the file system which may append entropy in the response. At step 610, an entropy pool element is inserted into network packet padding fields used for data alignment. Because a network packet must conform to formatting standards, the packet fields may be padded with data to ensure that the packet and its fields conform to the standards. Generally, some fields have relevant data which does not occupy the entire allocated size of the field, and the field may be padded to meet the allocated size. Therefore, embodiments disclosed herein may "pad" the network packet and its fields with entropy pool elements, instead of padding the packet with otherwise useless (and discarded) data. If several fields of the network packet are to be padded, entropy pool elements may be inserted into each of the fields. At step 620, the entropy collection mechanism may insert entropy pool elements into unused network packet fields. An unused field may a field which would otherwise contain no data. The entropy collection mechanism may insert entropy pool elements into these unused network packet fields such that the payload of the network packet is more fully utilized. At step 630, the entropy collection mechanism may append entropy pool elements to the network packet at a specified location. The location may be any predefined location of the network packet, including, but not limited to, the end of the network packet. A system standard may be implemented to ensure that the entropy collection mechanism knows where to place the entropy pool elements, and such that the entropy generation mechanisms of the I/O nodes will know where to extract the entropy pool elements from.

Embodiments disclosed herein describe techniques of transmitting entropy pool elements from a file system having entropy pool elements to I/O (and compute) nodes which may not have entropy pool elements. By adding the entropy pool elements in network packets sent from the file system to the I/O nodes, the cost of sending the entropy pool elements is almost zero. The cost is less than sending dedicated packets exclusively containing entropy pool elements from the file system to the I/O nodes. By providing entropy pool elements to the I/O nodes, a random number generator of the I/O nodes may have a higher entropy property, such that the random number generator has an equal probability of outputting each individual value of a set of predefined values that the random number generator is configured to output.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to distribute entropy data to input/output nodes in a parallel computing system obtained from a file system, comprising:
    responsive to receiving a file system request from an input/output (I/O) node to perform a file system operation, retrieving a first entropy pool element from the file system, wherein the first entropy pool element comprises a unique identifier of a disk in the file system; and
    inserting, at the file system, the first entropy pool element into a network packet sent to the requesting I/O node from the file system responding to the file system request.

2. The method of claim 1, wherein the the unique identifier is of at least one of: (i) a sector of the disk, (ii) a cylinder of the disk, (iii) a platter of the disk, and (iv) a zone of the disk, wherein inserting the first entropy pool element into a network packet comprises at least one of: (i) storing the first entropy pool element in an unused field; (ii) adding the first entropy pool element to one or more fields used for data alignment; and
    (iii) appending the first entropy pool element to the network packet.

3. The method of claim 2, further comprising:
    extracting, at a first I/O node of the parallel computing system, the first entropy pool element from the network packet; and
    storing the first entropy pool element in an entropy pool of the first I/O node.

4. The method of claim 3, wherein the first entropy pool element comprises an arbitrary length sequence of bits used as input in a random number generator stored in a memory of the I/O node in order to compute a random number.

5. The method of claim 4, wherein the first entropy pool element is retrieved from an entropy pool of the file system.

6. The method of claim 5, wherein the first entropy pool element is added to the entropy pool of the first I/O node to improve the entropy property of the random number generator, wherein the random number generator is configured to accept the first entropy pool element as input.

7. The method of claim 6, wherein the file system operation comprises at least one of: (i) a read, and (ii) a write, the method further comprising:
    accepting the first entropy pool element as input by the random number generator; and
    generating a value by the random number generator, based on the first entropy pool element.

* * * * *